Dec. 12, 1944.          S. SCHNELL          2,364,664
BRAKE SHOE ADJUSTING MECHANISM
Filed June 23, 1943
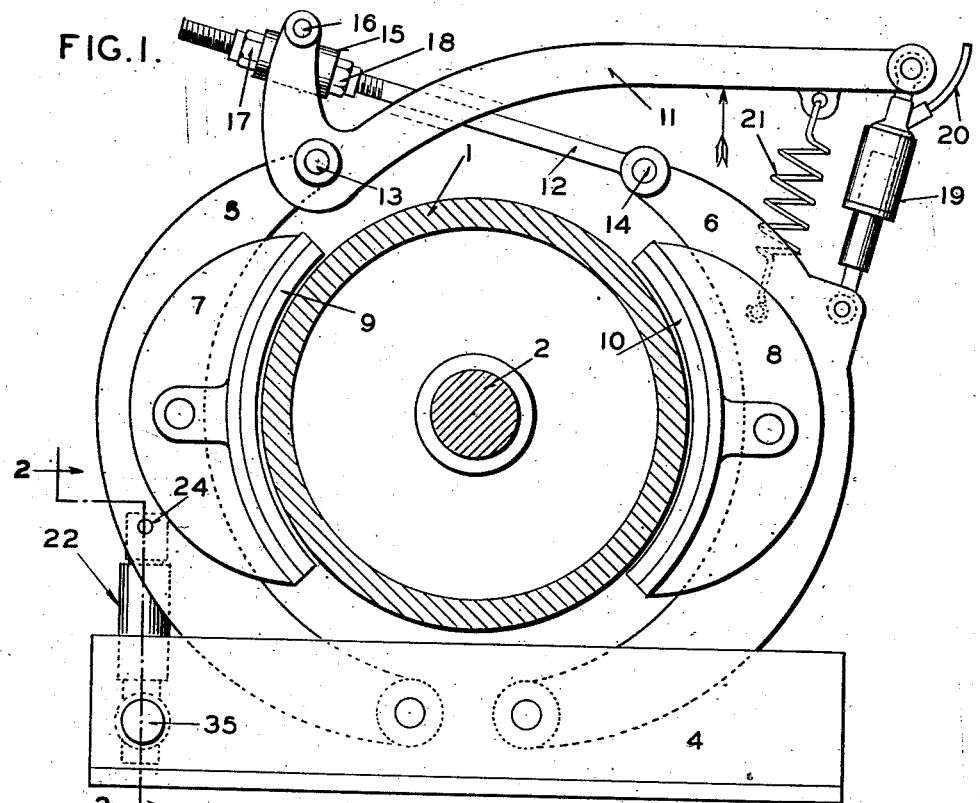
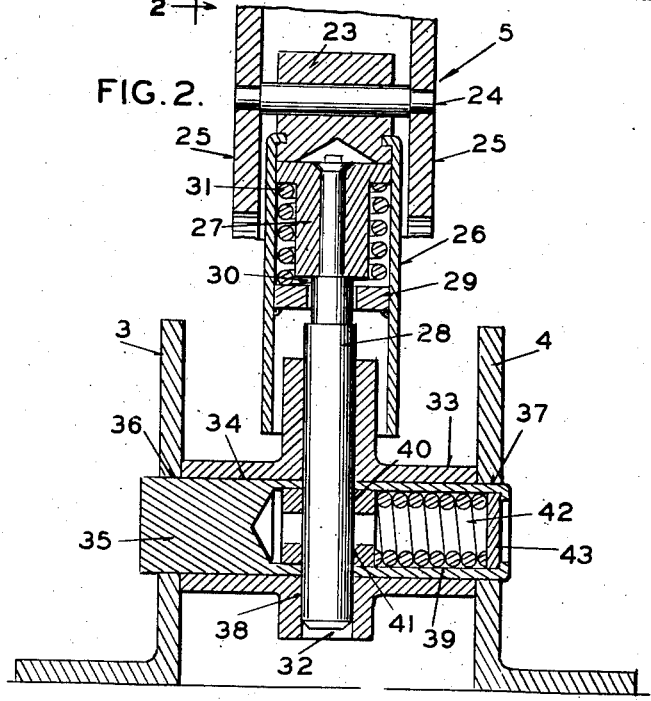
INVENTOR
STEVE SCHNELL
BY
ATTORNEY Patented Dec. 12, 1944

2,364,664

UNITED STATES PATENT OFFICE 2,364,664

BRAKE SHOE ADJUSTING MECHANISM

Steve Schnell, Kirkwood, Mo., assignor to Wagner Electric Corporation, St. Louis, Mo., a corporation of Delaware Application June 23, 1943, Serial No. 491,917

5 Claims. (Cl. 188—79.5)

My invention relates to brakes and more particularly to adjusting mechanism for a brake shoe thereof, its primary object being to provide improved automatically operable adjusting mechanism to maintain the "Off" position clearance of a brake shoe substantially constant notwithstanding wear of the shoe lining.

Another object of my invention is to produce a simple automatically operable adjusting mechanism for a brake shoe which may be easily associated with the brake shoe and which is so constructed that it will be protected from water, ice, dirt and other undesirable substances.

Other objects of my invention will become apparent from the following description taken in connection with the accompanying drawing in which Figure 1 is a view of a brake having associated with one of its shoes an automatic adjusting mechanism embodying my invention; and Figure 2 is a sectional view showing the parts of the adjusting mechanism, said view being taken on the line 2—2 of Figure 1.

Referring to the drawing in detail, I have disclosed an automatic adjusting mechanism embodying my invention as being associated with a brake employed for industrial purposes, such as one used on a crane. As seen in Figure 1, this brake comprises a drum 1 secured to a shaft 2 and beneath the drum is a base comprising two angle members 3 and 4. Pivoted on these angle members are two levers 5 and 6 carrying brake shoes 7 and 8 provided with linings 9 and 10, respectively. The upper ends of levers 5 and 6 are connected together by an L-shaped lever 11 and a link 12. The heel end of the L-shaped lever is pivoted to lever 5 by a pin 13 and one end of link 12 is pivotally connected to lever 6 by a pin 14. The other end of this link is adjustably connected to the toe end of lever 11 by a sleeve 15 pivoted thereon by a pin 16 and adjustably connected to the link by nuts 17 and 18 threaded on the link. The control means for actuating lever 11 comprises a fluid motor 19 connected between the free end of lever 11 and lever 6, said motor having a conduit 20 connected to any suitable source of fluid pressure as, for example, a master cylinder device. A retracting spring 21 is connected between lever 11 and lever 6.

When fluid under pressure is not being forced into the fluid motor 19, spring 21 will act upon lever 11 to move levers 5 and 6 away from the drum and disengage brake shoes 7 and 8. When it is desired to apply the brake, fluid under pressure is forced into fluid motor 19, thus rotating the lever in the direction of the arrow to cause levers 5 and 6 to be moved toward the drum and thereby engage brake shoes 7 and 8.

In this type of brake it is desirable to maintain a predetermined clearance between one of the brake shoes, and the drum when the brake is released regardless of wear of the linings of the brake shoes. When this is done, the other brake shoe will also be maintained clear of the brake drum and will not drag thereon when the brake is not being applied. This is best accomplished by an automatic adjusting means associated with one of the brake shoes. Such an adjusting mechanism should be easily associated with the brake shoe, readily accessible, and so constructed that it will operate efficiently under all conditions, particularly undesirable weather conditions since the industrial brake is generally exposed to rain, snow, ice, dust and other undesirable substances.

The particular adjusting mechanism shown as embodying my invention is generally indicated by the numeral 22 and is positioned between the base of the brake and lever 5 carrying brake shoe 7. This adjusting mechanism is shown in detail in Figure 2 and comprises a cylindrical block 23 pivotally mounted, by a pin 24, between flanges 25 of the lever which is of U-shaped cross-section. Secured to this block is a cylindrical shell 26 which receives a piston-like member 27 in its inner end for abutment with block 23. This member 27 is secured to the end of rod 28 extending out of shell 26. The piston member is confined in the shell between block 23 and a stop member 29 welded to the inner surface of the shell, said stop member being spaced from block 23 a distance slightly greater than the length of member 27 to thus provide a clearance 30 determining the amount of relative movement permitted between member 27 and both the shell and the block. This clearance also determines the amount of clearance the brake shoe 7 will have when the brake is in released condition. A spring 31 is interposed between stop 29 and a flange portion of member 27 in order to bias the member into engagement with block 23.

The lower end of rod 28 is adapted to be slidably received in a bore 32 of member 33 positioned between the angle members 3 and 4 of the base. This member 33 is also provided with a bore 34 at right angles to bore 32, and received in this bore is a pin 35 which acts as a shaft to pivot member 33 in bearing openings 36 and 37 of angle members 3 and 4. The shaft is provided with a cross-bore 38 for also receiving rod 28. An axial bore 39 in the shaft slidably receives a cylindrical member 40 provided with a cross-bore 41 having such diameter as to snugly receive rod 28. This cylindrical member is acted upon by a strong coil spring 42 interposed between it and a closure plate 43 at the outer end of bore 39. The arrangement is such that spring 42 applies pressure through member 40 to frictionally hold rod 28 from sliding through bore 38 of shaft 35. The frictional gripping, however, is not great enough to prevent movement of rod 28 with respect to member 33 when the strong force necessary to apply the brake acts on the rod in an axial direction.

When the brake is in its released condition, the parts of the automatic adjusting mechanism will assume the positions shown in Figure 2 and clearance 30 will be present between stop 29 and member 27. When the brakes are applied, lever 5 will be moved toward the drum and will carry with it block 23 and shell 26 thereby compressing spring 31 and placing the clearance between block 23 and member 27. The relative movement permitted between member 27 and block 23 by clearance 30 will permit shoe 7 to be applied to the drum. When the brake is released, the parts will again assume their positions, as shown in Figure 2, and member 27 will act as a stop in determining the "off" position of shoe 7. Member 27 and rod 28 will not be moved relatively to member 33 in the base of the brake since the gripping action caused by spring 42 will be great enough to prevent any movement of rod 28 through spring 31. Since brake shoe 7 can only be moved away from the drum a predetermined distance as determined by the adjusting mechanism acting on an abutment for lever 5, the actuating lever 11 when released, will move shoe 8 away from the drum and prevent it from dragging thereon. The movement of shoe 8 away from the drum will be brought about by the action of retracting spring 21.

When there is wear of lining 9, lever 5 will have to move closer to the drum in order to apply brake shoe 7. When this movement occurs, stop 29 on shell 26 will engage member 27 and move rod 28 with respect to member 33 and slide said rod through the frictional gripping means to a new position. In this new position the clearance 30 will remain the same and when the shoe is released, its "off" position clearance with respect to the drum will also remain the same as it was prior to lining wear. Whenever there has been such a large amount of lining wear as to cause an undesirable angular movement of lever 11 in applying the brake, the connection between rod 12 and lever 11 may be adjusted so as to bring shoe 8 closer to the drum and thus shorten the necessary movement of lever 11 to apply the brake.

It is to be noted that in the adjusting mechanism just described the parts are all enclosed. No water, snow, or dirt can reach the friction gripping mechanism to prevent it from operating in the desired manner. Also, dirt and other undesirable substances are prevented from collecting around the spring 31 and between member 27 and either stop 29 or block 23 to change the clearance space determining the "off" position clearance of brake shoe 7. The entire structure of the adjusting mechanism is simple, easily constructed and assembled, and readily associated with the brake. No special setting of the adjusting mechanism is required when initially installed as it need only be attached to the lever and the base and then the brake applied. This will automatically cause rod 28 to be gripped and held in the proper position by the friction gripping means so that when the brake is released, the desired shoe clearance is established by the clearance space 30 built into the adjusting mechanism.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a support, a brake drum, a friction element for cooperation with the drum, means for actuating the friction element, and automatic adjusting means for the friction element for maintaining the "off" position clearance thereof substantially constant notwithstanding wear of its friction surface, said adjusting means comprising a member connected to move with the friction element, a rod, means cooperating with the last named member and the rod for permitting limited relative movement therebetween, a member having a bore receiving the rod, a pivot pin for connecting the last named member to the support, and means associated with the pivot pin for causing the rod to be frictionally held in the bore.

2. In braking apparatus, a support, a brake drum, a brake friction element for cooperation with the drum, means for actuating the friction element, and automatic adjusting means for the friction element for maintaining the "off" position clearance thereof substantially constant notwithstanding wear of its friction surface, said adjusting means comprising a pivoted member connected to move with the friction element, a cylindrical shell carried by the pivoted member, a rod positioned in the shell, a spring between the rod and the shell acting to bias the rod toward the pivoted member, means permitting a predetermined movement of said rod relatively to the member and shell and in a direction against the bias of the spring and means carried by the support for frictionally gripping the rod.

3. In braking apparatus, a support, a brake drum, a brake friction element for cooperation with the drum, means for actuating the friction element, and automatic adjusting means for the friction element for maintaining the "off" position clearance thereof substantially constant notwithstanding wear of its friction surface, said adjusting means comprising a pivoted member connected to move with the friction element, a cylindrical shell carried by the pivoted member, a rod positioned in the shell, a spring between the rod and the shell acting to bias the rod toward the pivoted member, means permitting a predetermined movement of said rod relatively to the member and shell and in a direction against the bias of the spring, a member pivoted to the support and having a bore at right angles to its pivotal axis for receiving the rod and spring-operated means carried by said last named pivoted member for frictionally holding the rod in the bore.

4. In braking apparatus, a brake drum, a support having spaced portions extending beneath the drum, a brake shoe pivotally mounted on the support and positioned on one side of the drum, means for actuating the shoe, and automatic adjusting means between the support and the shoe comprising a pivoted member connected to move with the shoe, a rod, means for permitting predetermined relative movement between the member and rod, a member positioned between the spaced support portions and pivoted thereto, said member having a bore receiving the rod with the axis of said bore being at right angles to the pivotal axis of the member and spring means carried by said pivotal member for frictionally holding the rod in the bore.

5. In braking apparatus, a brake drum, a support having spaced portions extending beneath the drum, a brake shoe pivotally mounted on the support and positioned on one side of the drum, means for actuating the shoe, automatic adjusting means between the support and the shoe comprising a pivoted member connected to move with the shoe, a rod, means for permitting predetermined relative movement between the member and rod, a member positioned between the spaced support portions, a shaft for pivotally mounting the last named member on the support portions, said last named member and the shaft being provided with bores receiving the rod, and spring means carried by the shaft for frictionally holding the rod in the shaft bore.

STEVE SCHNELL.